United States Patent
Isobe

(10) Patent No.: US 11,772,220 B2
(45) Date of Patent: Oct. 3, 2023

(54) MACHINE TOOL SYSTEM

(71) Applicant: FANUC CORPORATION, Yamanashi (JP)

(72) Inventor: Gaku Isobe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 252 days.

(21) Appl. No.: 17/082,901

(22) Filed: Oct. 28, 2020

(65) Prior Publication Data

US 2021/0178541 A1    Jun. 17, 2021

(30) Foreign Application Priority Data

Dec. 16, 2019   (JP) .................................. 2019-226301

(51) Int. Cl.
  *B23Q 11/00*   (2006.01)
  *B08B 3/02*    (2006.01)
  *B05B 12/04*   (2006.01)

(52) U.S. Cl.
  CPC .......... *B23Q 11/0042* (2013.01); *B05B 12/04* (2013.01); *B08B 3/02* (2013.01)

(58) Field of Classification Search
  CPC ..... B08B 3/024; B08B 17/025; B23Q 11/005; B23Q 11/0042; B23Q 11/0891; B23Q 11/1076
  See application file for complete search history.

(56) References Cited

U.S. PATENT DOCUMENTS

2017/0144262 A1 *  5/2017  Okuda ................ B05B 13/0431
2018/0246494 A1    8/2018  Nakahama

FOREIGN PATENT DOCUMENTS

| JP | 10118884 A | * | 5/1998 |
| JP | 2017-094420 A | | 6/2017 |
| JP | 2018-138327 A | | 9/2018 |
| JP | 6487475 B2 | | 3/2019 |

* cited by examiner

*Primary Examiner* — David G Cormier
(74) *Attorney, Agent, or Firm* — Maier & Maier, PLLC

(57) ABSTRACT

The present invention provides a machine tool system including a machine tool body and a control device. The machine tool body includes: a cover that covers a machining region; chip expelling mechanisms that are disposed at a plurality of different positions inside the cover, that expel chips generated during processing, and a discharging ability of which is changeable; and a chip information obtaining unit that obtains information related to scattering directions of the chips during the processing. In accordance with the information related to the scattering directions of the chips and obtained by the chip information obtaining unit, the control device controls the discharging ability of one of the chip expelling mechanisms corresponding to a direction in which a largest amount of the chips have scattered so as to be larger than the discharging ability of another of the chip expelling mechanisms.

3 Claims, 5 Drawing Sheets

MACHINE TOOL SYSTEM

CROSS-REFERENCE TO RELATED APPLICATIONS

This application is based on Japanese Patent Application No. 2019-226301, the content of which is incorporated herein by reference.

TECHNICAL FIELD

The present disclosure relates to a machine tool system.

BACKGROUND ART

There is a known machine tool that includes a cover for preventing scattering of chips and cutting fluid, that detects a state inside the cover to determine the adhering state and deposition state of the chips, and that changes the discharge direction of a cleaning liquid (for example, see PTL 1).

CITATION LIST

Patent Literature

{PTL 1} Japanese Unexamined Patent Application, Publication No. 2017-94420

SUMMARY OF INVENTION

One aspect of the present disclosure is directed to a machine tool system including a machine tool body and a control device, wherein: the machine tool body includes a cover that covers a machining region, chip expelling mechanisms that are disposed at a plurality of different positions inside the cover, that expel chips generated during processing, and a discharging ability of which is changeable, and a chip information obtaining unit that obtains information related to scattering directions of the chips during the processing; and in accordance with the information related to the scattering directions of the chips and obtained by the chip information obtaining unit, the control device controls the discharging ability of one of the chip expelling mechanisms corresponding to a direction in which a largest amount of the chips have scattered so as to be larger than the discharging ability of another of the chip expelling mechanisms.

DESCRIPTION OF EMBODIMENT

A machine tool system 1 according to an embodiment of the present invention will be described below with reference to the drawings.

Figure 1:
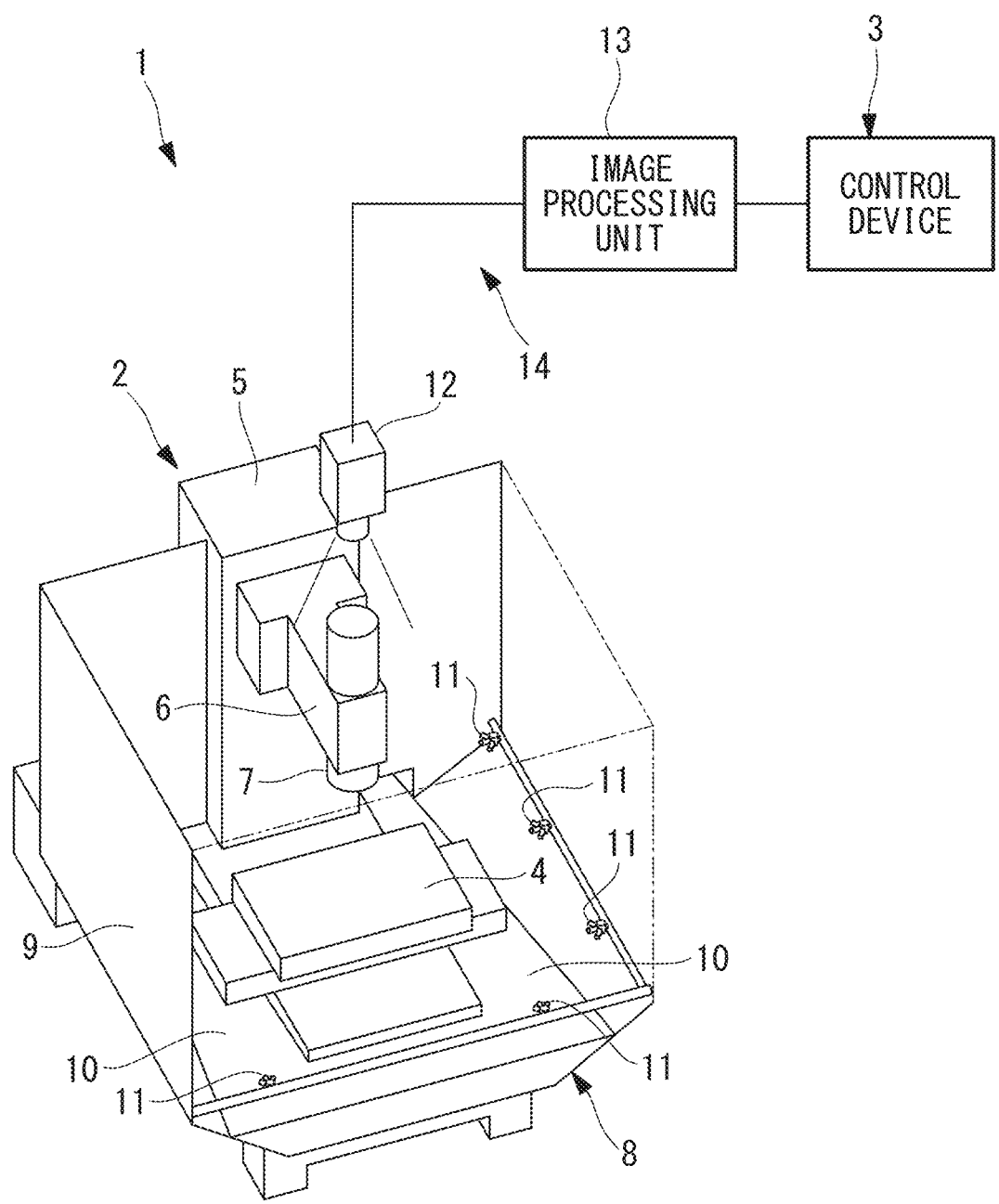
FIG. 1 is an overall configuration diagram illustrating a machine tool system according to an embodiment of the present disclosure.

As shown in FIG. 1, the machine tool system 1 according to this embodiment includes a machine tool body 2 and a control device 3.

The machine tool body 2 includes a table 4 on which a workpiece W (see FIGS. 2, 3, and 5) to be processed is mounted, and a main spindle 7 attached to a main spindle head 6 supported on a column 5, and to which a tool for processing the workpiece W is attached, and the machine tool body 2 is installed on a bed 8. A machining region in which the processing of the workpiece W is performed is covered by a cover 9 for preventing chips A generated during the processing or a cutting fluid from scattering around.

On the bed 8, slopes 10 inclining in a downward direction from a front side to a back side are provided on both sides of the table 4. The slopes 10 initially receive the chips A generated during the processing or the cutting fluid, cause the received chips A to flow down by means of a cleaning liquid (coolant) B supplied as will be described later, and expel the chips A to the outside of the cover 9.

Figure 2:
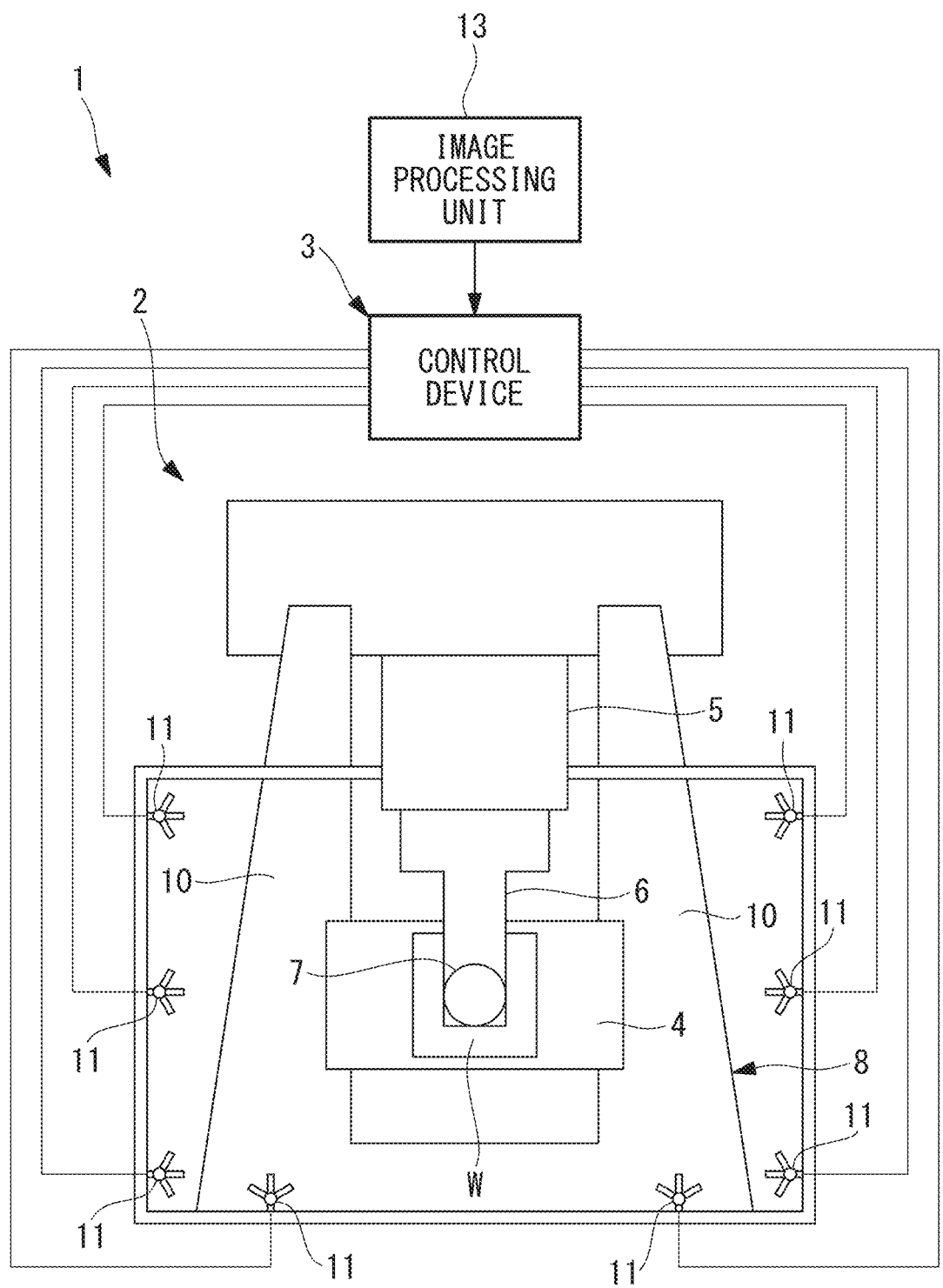
FIG. 2 is a plan view of the machine tool system in FIG. 1.
Figure 3:
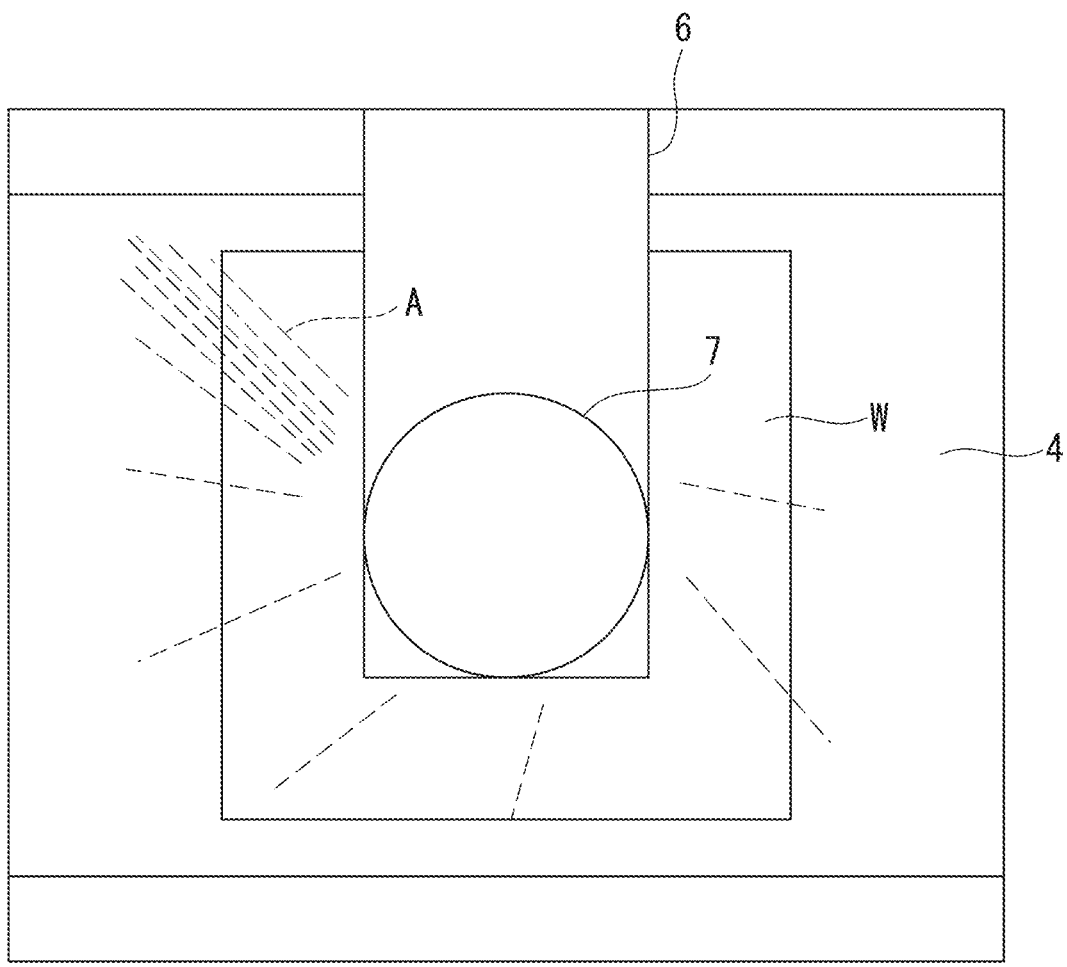
FIG. 3 is a diagram illustrating an example of an image obtained by a camera of the machine tool system in FIG. 1.

As shown in FIG. 2, nozzles (chip expelling mechanisms) 11 for discharging the cleaning liquid B are provided at a plurality of positions inside the cover 9 of the machine tool body 2. In the example shown in FIG. 2, for example, two nozzles 11 are provided on the front surface side of the cover 9, and one nozzle 11 is provided at an upstream position, a center position, and a downstream position of each of the two slopes 10. For example, the nozzle 11 at each position has discharge ports in three directions. This makes it possible to supply the cleaning liquid B over a wide area, and push away the chips A, etc. adhering to the wide area.

The machine tool body 2 includes a chip information obtaining unit 14 that obtains information related to the scattering directions of the chips A during the processing. The chip information obtaining unit 14 includes, above the main spindle head 6 in the cover 9, a camera 12 that photographs the main spindle head 6 and the workpiece W from above, and an image processing unit (scattering direction calculation unit) 13 that processes an image (see, for example, FIG. 3) obtained by the camera 12. The image processing unit 13 is connected to the camera 12.

Figure 4:
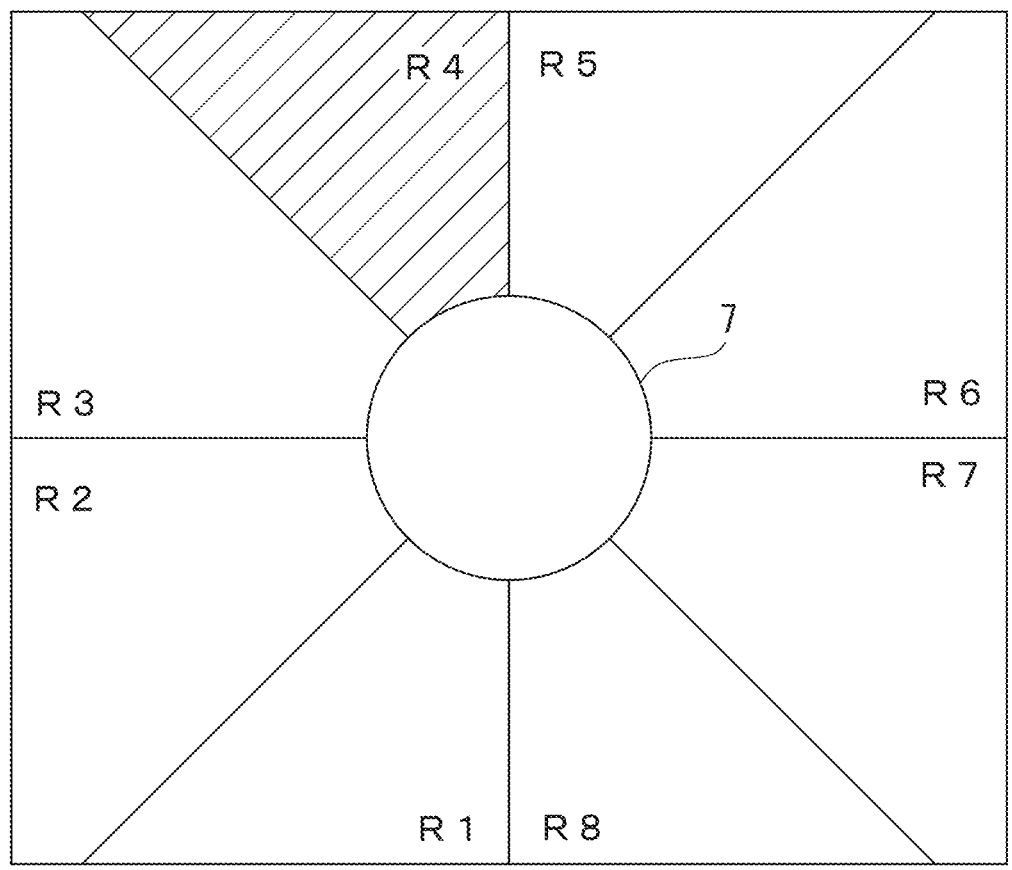
FIG. 4 is a diagram illustrating an region selected by analyzing the image in FIG. 3 and in which a large amount of chips have scattered, the region being indicated by hatching.

The image processing unit 13 processes the image to extract the chips A and calculates a direction in which the largest amount of the chips A have scattered. Regarding information related to the direction, for example, as shown in FIG. 4, the image is divided into regions R1 to R8, the number of which is equal to the number of the nozzles 11, and the number of a region in which the largest amount of the chips A have scattered is selected. The region R4 is selected in the example shown in FIG. 4. The selected region number is transmitted to the control device 3.

The control device 3 stores information related to the nozzles 11 in association with the regions R1 to R8 and performs control, in accordance with the information related to the region selected by the image processing unit 13, such that the discharge amount of the cleaning liquid B from a nozzle 11 corresponding to said direction is larger than the discharge amount from other nozzles 11. Here, the associations between the regions and the nozzles 11 may be one-to-one or one-to-many.

With the thus-configured machine tool system 1 according to this embodiment, when cutting of the workpiece W by a tool is started, an image of the tool and the workpiece W photographed from above by the camera 12 disposed above is obtained, for example, at prescribed sampling intervals. The obtained images are transmitted to the image processing unit 13 and are subjected to image processing. By doing so, the chips A in each image are extracted, and on the basis of the sizes and the number of the extracted chips A, a region number indicating a direction in which the total weight of the scattered chips A is the largest is selected.

Figure 5:
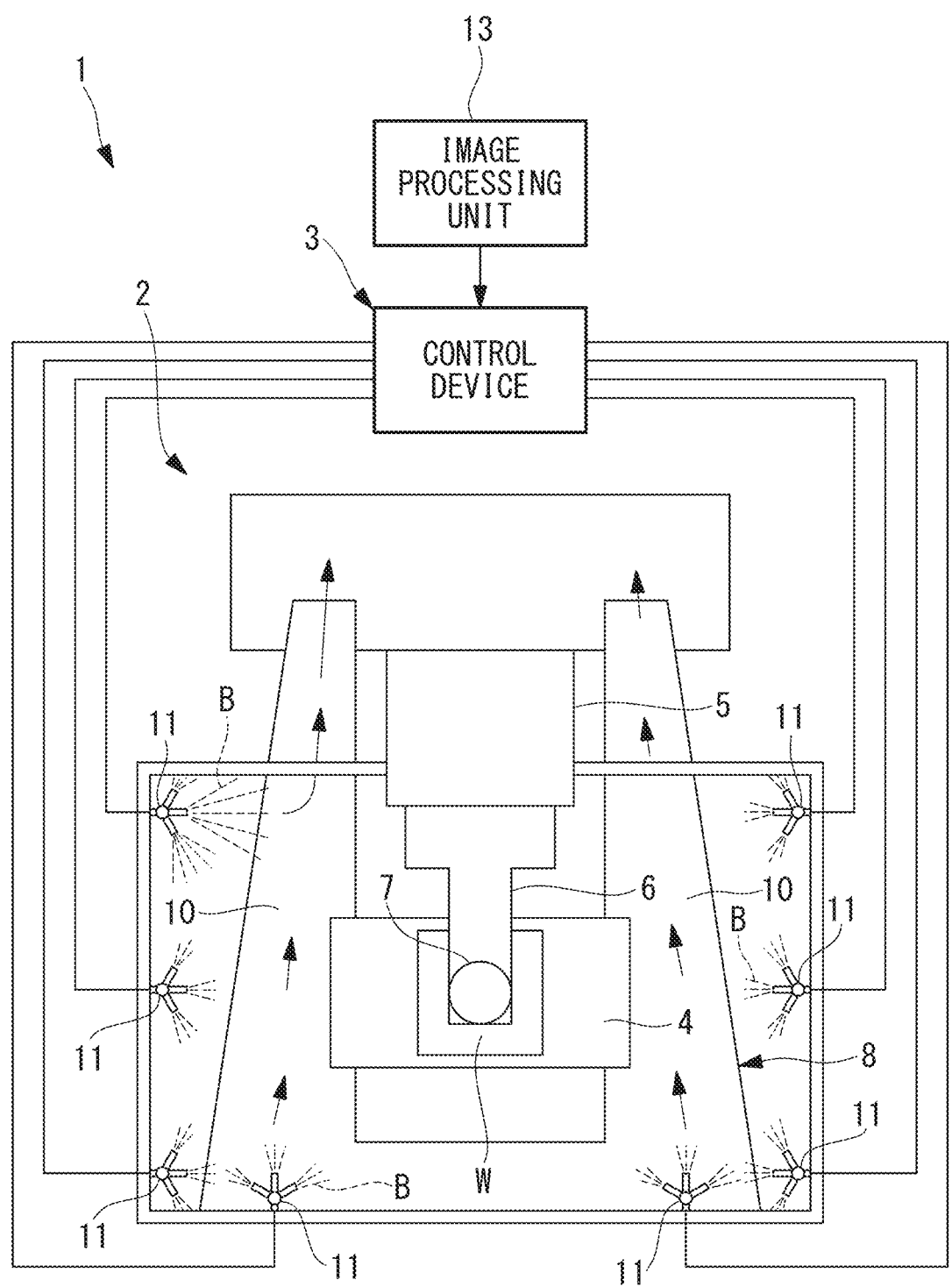
FIG. 5 is a plan view illustrating a state in which a large amount of cleaning liquid is being discharged from nozzles corresponding to the region selected in FIG. 4.

The selected region number is transmitted to the control device 3. In the control device 3, a nozzle 11 corresponding to the transmitted region number is selected, and for example, as shown in FIG. 5, the discharge amount of the cleaning liquid B from the selected nozzle 11 per unit time is made larger than those from the other nozzles 11. Thus, there is an advantage in that, since even a large amount of the chips A that have scattered and fallen on the bottom part of the cover 9 are washed away by a large amount of the cleaning liquid B, it is possible to wash away the chips A before the deposition or adhesion of the chips A.

Regarding the other nozzles 11, by causing the other nozzles 11 to discharge the cleaning liquid B with a lower discharge amount than that from the selected nozzle 11, it is possible to wash away a small amount of the chips A to prevent the deposition or adhesion.

Note that, in this embodiment, the image processing unit 13 extracts the chips A in an image and calculates, on the basis of the sizes and the number of the chips A, a direction in which the largest amount of the chips A have scattered. Although the method for image processing in the image processing unit 13 may be arbitrary, for example, the scattering directions of the chips A may be estimated by obtaining and storing, in advance, an image when the cutting processing has not yet been performed, and comparing the image with an image obtained during the cutting processing.

Furthermore, although the scattering direction is calculated on the basis of the sizes and the number of the chips A, since the chips A having long lengths have the property that they become mutually entangled and easily deposited, the lengths of the chips A may be extracted from the image, and the discharge amount from a nozzle 11 in a direction in which the chips A having long lengths have scattered may be increased.

Furthermore, in this embodiment, although nozzles 11 that discharge the cleaning liquid B have been described as an example of chip expelling mechanisms, the chip expelling mechanisms are not limited to this embodiment, and a suction means for sucking the chips A or a chip conveyor that conveys the chips A may be employed.

REFERENCE SIGNS LIST

1 machine tool system
2 machine tool body
3 control device
9 cover
11 nozzle (chip expelling mechanism)
12 camera
13 image processing unit (scattering direction calculation unit)
14 chip information obtaining unit
A chip
B cleaning liquid

The invention claimed is:

1. A machine tool system comprising:
a machine tool body; and
a control device;
wherein the machine tool body comprises:
a cover that covers a machining region; and
a plurality of nozzles that are disposed at a plurality of different positions inside the cover that expel chips generated during processing by discharging a cleaning liquid;
a chip information obtaining unit that obtains information related to scattering directions of the chips during the processing; and
in accordance with the information related to the scattering directions of the chips and obtained by the chip information obtaining unit, the control device controls an amount of the cleaning liquid discharged per unit time of a nozzle of the plurality of nozzles corresponding to a direction in which a largest amount of the chips have scattered to be larger than the amount of the cleaning liquid discharged per unit time of the other plurality of nozzles without stopping discharge of the cleaning liquid from any one of the plurality of nozzles.

2. The machine tool system according to claim 1, wherein the chip information obtaining unit comprises:
a camera that obtains an image of the chips generated during the processing; and
an image processor being configured to calculate the direction in which the largest amount of the chips have scattered by processing the image obtained by the camera.

3. The machine tool system according to claim 2, wherein the image processor is configured to process the image obtained by the camera, extract the image of the chips, and calculate the direction in which the largest amount of the chips have scattered on a basis of sizes and a number of the extracted chips.

* * * * *